United States Patent [19]
Chen

[11] Patent Number: 5,907,096
[45] Date of Patent: May 25, 1999

[54] DETECTING FIELDS WITH A TWO-PASS, DUAL-AMPLITUDE-MODE SCANNING FORCE MICROSCOPE

[75] Inventor: Dong Chen, Boca Raton, Fla.

[73] Assignee: International Business Machines Corporation, Armonk, N.Y.

[21] Appl. No.: 08/867,137

[22] Filed: Jun. 2, 1997

[51] Int. Cl.$^6$ .................................................. G01B 7/34
[52] U.S. Cl. ............................................................ 73/105
[58] Field of Search .............................. 73/105; 250/306, 250/307

[56] References Cited

U.S. PATENT DOCUMENTS

| | | | |
|---|---|---|---|
| 4,724,318 | 2/1988 | Binning | 250/306 |
| 4,954,704 | 9/1990 | Elings et al. | 250/307 |
| 5,338,932 | 8/1994 | Theodore et al. | 250/306 |
| 5,416,327 | 5/1995 | Weiss et al. | 250/307 |
| 5,418,363 | 5/1995 | Elings et al. | 250/306 |
| 5,481,908 | 1/1996 | Gamble | 73/105 |
| 5,507,179 | 4/1996 | Gamble et al. | 73/105 |
| 5,627,365 | 5/1997 | Chise et al. | 73/105 X |
| 5,646,339 | 7/1997 | Bayer et al. | 73/105 |

OTHER PUBLICATIONS

*IBM Technical Disclosure Bulletin*, Fast Image Acquisiton wih Scanning Tunneling Microscope or Atomic Force Microscope vol. 36, No. 03, Mar., 1993, p. 93 & p. 94.

"Scanning Probe Microscopy Technology & Recent Innovations" Y.E. Strausser, et al, *American Laboratory*, May, 1994, 8 pages.

"Magnetic Force Microscopy: . . . Media" D. Rugar, et al, *Journal of Applied Physics*, vol. 68(3), Aug. 1990, pp. 1169–1183.

"Magnetic Imaging by Force Microscopy . . . resolution" Martin and Wickramasinghe, *Applied Physics Letters*, vol. 50, May 1987, pp. 1455–1457.

"Separation of Magnetic . . . in force Microscopy" Schonenberger et al., *Journal of Applied Physics*, vol. 67, Jun. 1990, pp. 7278–7280.

R. Wiesendanger, *Scanning Probe Microscopy and Spectroscopy—Methods and Applications*, Cambridge University Press, 1994, pp. 241–243 and 253–256.

*Primary Examiner*—Thomas P. Noland
*Attorney, Agent, or Firm*—Richard A. Tomlin; Ronald V. Davidge

[57] ABSTRACT

A scanning probe microscope is used as an atomic force microscope during a first pass of a vibrating probe tip along a line extending along a sample surface, with data representing topographical features occurring along the line being stored. In a second pass along the line, the topographical data is used to allow movement of the vibrating probe tip with the center of vibration at a fixed distance above the sample surface, as the resulting amplitude or phase angle of probe vibration provides an indication of the level of a magnetic or electric field. In the second pass, the amplitude of probe tip vibrations is substantially less that the amplitude of such vibrations in the first pass, so that the probe operates out of contact with the sample surface, even if the center of such vibrations occurs at the same level during both passes, or if this center is brought closer to the sample surface during the second pass.

7 Claims, 2 Drawing Sheets

DETECTING FIELDS WITH A TWO-PASS, DUAL-AMPLITUDE-MODE SCANNING FORCE MICROSCOPE

CROSS-REFERENCE TO RELATED APPLICATIONS

This application is related to a copending U.S. application Ser. No. 08/867,138, filed Jun. 2, 1997, entitled "Controlling Engagement with a Segmented Bimorph Piezoelectric Actuator," Docket No. BC9-97-007, having a common assignee herewith, filed on an even day herewith, which is hereby incorporated herein by reference. This copending application describes the use of a segmented bimorph piezoelectric actuator to provide movement, in accordance with a plurality of input signals, to the proximal end of a cantilever having a probe tip at its distal end. In an embodiment of this application used as an atomic force microscope, an individual probe segment is used for the application of vibration excitation.

This application is also related to a copending U.S. application Ser. No. 08/867,136, filed Jun. 2, 1997, entitled "Detecting Fields with a Single-Pass, Dual-Amplitude-Mode Scanning Force Microscope", Docket No. BC9-97-009, having a common assignee herewith, filed on an even day herewith, which is hereby incorporated herein by reference. This application describes the use of a scanning force microscope driven along a scan line incorporating a number of sample points. Between the sample points, the probe tip is vibrated through a relatively large amplitude about a center of vibration which is moved by the methods of an atomic force microscope. At each sample point, the probe is vibrated through a relatively small amplitude about a center of vibration which is derived from the most recent operation of the device as an atomic force microscope.

BACKGROUND OF THE INVENTION

1. Field of the Invention

This invention relates to a method for measuring magnetic or electric fields within a sample material and, more particularly, to a method using a scanning force microscope to track the topography of the surface so that such fields occurring close to the material surface are accurately measured at a small, constant distance from the surface.

2. Background Information

The measurement of a magnetic or electric field occurring within a sample material, from a measurement point traversing the surface of the material at a very close spacing beyond this surface, has been a subject of an ongoing effort by scanning probe microscopy researchers for several years. A measurement process of this type requires that a probe sensitive to magnetic or electric fields must be moved in a direction perpendicular to the sample surface during the traversing, or scanning process, so that the probe tracks the topography of the sample surface without contacting it. Moving the probe in this way is both important and difficult when the sample surface is quite rough, as is the surface of a number of materials for which this type of measurement can provide significant information, such as the surfaces of magnetic data storage media.

The scanning force microscope provides an accurate method for moving a probe along a surface in very close proximity thereto. A probe having a very sharp tip is moved along the sample surface being examined by means of a lateral actuator. The probe is mounted to a distal end of a cantilever, the proximal end of which is attached to a vertical actuator, which moves the probe tip into and out of engagement with the sample surface. Vibration in this vertical direction is applied to the distal end of the cantilever through the vertical actuator at a frequency close to the resonant frequency of the cantilever. The vibration of the probe tip at this frequency is measured. As topographical features of the sample surface increase the engagement of this surface with the probe tip, the probe tip vibration is decreased. As this engagement is decreased, the probe tip vibration increases up to a point at which the probe is freely vibrating out of contact with the sample surface. A feedback signal is generated as a difference between a signal representing probe tip vibration and a setpoint signal representing a level of vibrations occurring with the operational level of engagement desired between the probe tip and the sample surface. This feedback signal is used within a servomechanism loop including the vertical actuator to maintain the engagement at this operational level during lateral scanning.

However, when a single probe is used to track the surface topography, with a method such as that of the scanning force microscope, and simultaneously to track magnetic or electric fields, the signals produced by changes in topography tend to become mixed with the signals caused by these fields, so that accurate information cannot be recovered. What is needed is a way for separating the measurement of topography from the measurement of a field, while moving the probe in response to topographical variations during field measurements.

DESCRIPTION OF THE PRIOR ART

U.S. Pat. No. 4,724,318 describes an atomic force microscope, in which a sharp point is brought so close to the surface of a sample to be investigated that the forces occurring between the atoms as the apex of the point and those at the surface cause a spring-like cantilever to deflect. The cantilever forms one electrode of a tunneling microscope, the other electrode being a sharp tip. The deflection of the cantilever provokes a variation of the tunnel current, and that variation is used to generate a correction signal which can be employed to control the distance between the point and the sample, in order, for example, the force between them constant as the point is scanned across the surface of the sample by means of an xyz-drive, with the sample being driven in a raster scan in the xy-plane. In certain modes of operation, either the sample or the cantilever may be excited to oscillate in the z-direction. If the oscillation is at the resonant frequency of the cantilever, the resolution is enhanced. Using this method, a topographical image of a sample surface having a resolution better than 100 nanometers may be obtained by employing the following steps: A sharp point which is fixed to one end of a spring-like cantilever is brought so close to the surface of the sample to be inspected that the forces occurring between the point and the sample surface are larger than $10^{-20}$ Newton, so that the resulting force deflects the cantilever. The deflection of the cantilever is detected by means of a tunnel tip disposed adjacent the cantilever. The tunnel current then flowing across the gap between the cantilever and tunnel tip is maintained at a constant value by using any detected variations of the tunnel current to generate a corrections signal. The correction signal is used, among other things, to maintain the point-to-sample distance constant.

Several methods have been developed for separating the measurement of surface topography from the simultaneous measurement of magnetic and electric fields. For example, D. Ruger, et al., writing in the *Journal of Applied Physics*, Vol. 68(3), page 1169 in 1990, describe the measurement of magnetic forces by applying an additional direct current bias of 0 to 10 volts between the probe and the sample. This electrical bias provides an attractive electrostatic force gradient which is only a function of the distance between the probe and the sample surface. This attractive electrostatic force combines with the magnetic forces to be measured, which vary along the sample surface, to form an overall attractive force gradient that increases in magnitude as the probe approaches the surface. This additional attractive force assures that the overall force remains attractive, so that the servo loop keeping the probe tracking above the sample surface is stabilized, despite the fact that magnetic forces may be either attractive or repulsive.

However, the contours of the constant-force gradient measured in this way do not necessarily reflect only a level of magnetic contrast, due to the dependence of the non-magnetic forces on the distance between the probe tip and the sample surface. That is, if the force gradient of the non-magnetic force is a nonlinear function which is comparable in magnitude to the measured magnetic force gradient, then the resulting vertical-axis response of the apparatus to the magnetic force gradient is also nonlinear. Furthermore, when this method is used on a rough surface, the distance between the probe tip and the surface must be relatively large to avoid the contamination of the magnetic-force gradient map with topographical data. When this distance is large, the spatial resolution and signal-to-noise ratio of the magnetic force measurements are decreased.

Another method for separating the simultaneously-occurring signals caused by responses to variations in topography and magnetic fields is the use of modulation technology, as described by Martin and Wickramasinghe, in *Applied Physics Letters,* vol. 50, page 1455, in 1987, and by Schonenberger et al. in the *Journal of Applied Physics,* Vol. 67, page 7278, in 1990. With this technique, for example, adding an AC modulation signal to the applied DC bias causes a second-harmonic oscillation of the cantilever. The amplitude of this oscillation is used to drive a feedback loop adjusting the separation between the probe tip and the sample surface. While the vertical (Z-direction) movement of a piezoelectric actuator required to hold the tip vibration amplitude at a pre-determined value is used, in the manner of a conventional scanning force microscope, to provide an indication of the surface topography, the DC force is measured by detecting quasi-static deflections of the cantilever, as indicated by variations in the difference between the deflection of the probe tip and the movement of the actuator. A disadvantage of this method lies in the difficulty of measuring these quasi-static deflections in a manner providing an accurate depiction of the underlying electric or magnetic field. Such deflections are not easily measured with the accuracy available through the use of AC methods depending on changes in the amplitude of vibrations occurring at a frequency near the resonate frequency of the cantilever.

Another method for measuring magnetic fields, or other non-topographical features of a sample, is described in U.S. Pat. No. 5,418,363. This method employs a first pass of the probe along a scan line on the surface of the sample to determine its topography by conventional means, such as by the method of atomic force microscopy. During this first pass, the topographical data is stored. In a second pass, the sample surface is scanned along the same line, with this stored topographical data being used to ensure that the probe is at all times displaced from the sample surface by a pre-determined offset distance.

In an embodiment of such apparatus configured to measure magnetic fields, a probe is incorporates a magnetic tip, and the first pass is provided using the method of an atomic force microscope, During the second pass, the magnetic tip is maintained above the surface of the sample to allow the measurement of magnetic forces in the sample. During this second pass, the deflection of the cantilever, may be measured directly by a detector, or the cantilever may be vibrated near resonance, with the resulting amplitude or phase of vibration being measured by a detector.

An example of measurements made with such apparatus is given by Y. E. Strausser et al., in *American Laboratory,* May, 1994, is a measurement of the topography and magnetic force gradients of the surface of a hardfile disk. In this example, the topography had variations of 120 nm peak-to-peak. The tip followed this topography, but at a displacement 100 nm above the surface.

In an embodiment of such apparatus configured to measure electric fields, the apparatus includes a conducting tip, with the first pass being performed as either an atomic force microscope or a scanning tunneling microscope. During the second pass, a voltage source provides for a voltage differential between the tip and the sample. In this way, an electric field is developed between the tip and the sample, indicating, for example, if the sample is an integrated circuit, the presence of various circuit elements below the surface.

What is needed is a method to avoid contact between the probe tip and the sample surface during the second pass without increasing the distance between the center of probe vibrations and the sample surface during the second pass, so that the spacial resolution and signal-to-noise ratio of the field measurements can be significantly improved.

The use of a vibrating probe to measure gradients within a force field has been described by R. Wiesendanger in *Scanning Probe Microscopy and Spectroscopy—Methods and Applications,* Cambridge University Press, 1994, on pages 241–243. In such a field, the effective spring constant is given by:

$$c_{\text{eff}} = c - F' \quad \text{where} \quad F' = \frac{\partial F_z}{\partial z}$$

In the above equation, c is the spring rate of the cantilever in the absence of a force field, and $c_{\text{eff}}$ is the effective spring rate of the cantilever in the presence of the force field. In an attractive force field, with the probe tip being attracted to the surface, the cantilever is effectively softened. In a repulsive force field, with the probe tip being repelled by the surface, the cantilever is effectively stiffened.

The change in the resonant frequency of vibrations of the cantilever/mass system is given by:

$$\omega = \sqrt{\frac{c_{\text{eff}}}{m}} = \omega_0 \sqrt{1 - \frac{F'}{c}}$$

In the above equation, m is an effective mass, and $\omega_0$ is the resonant frequency of the system in the absence of a force gradient.

Various methods for making a probe tip suitable for the measurement of magnetic forces under the conditions of non-contact force microscopy are described by R. Wiesendanger in *Scanning Probe Microscopy and Spectroscopy—Methods and Applications,* Cambridge University Press, 1994, on pages 253–256. A first example of a magnetic force sensor is a cantilever with an integrated tip formed by electrochemical etching of a thin nickel, iron, or cobalt wire. After the wire is etched, it is bent at its distal end to form a tip. Alternately, a non-magnetic tip, composed of a material such as tungsten, after surface preparation by electrochemical etching, is coated with a thin layer, typically 50 nm, of ferromagnetic material, either by sputtering or by galvanic deposition. This layer is magnetized after deposition. A magnetic tip coating technique has also been applied to microfabricated silicon cantilevers, which may be built to provide specific properties based on a choice of coating material and thickness.

SUMMARY OF THE INVENTION

An objective of the present invention is to provide a method for reducing the distance between the center of vibration of a probe during the measurement of a magnetic or electric field, so that the spatial resolution and signal-to-noise ratio of such a measurement can be improved.

In accordance with an aspect of the present invention, there is provided a method for measuring a force field extending outward from a sample surface along a line with a scanning probe microscope. The method includes the steps of measuring topographical features of the sample surface along the line in a first pass, and of measuring the force field as the line is traversed by the probe tip in a second pass.

In the first pass, the scanning probe microscope is used as an atomic force microscope, with the probe tip being vibrated at a first vibration frequency and at a first vibration amplitude as it traverses the line, and with data representing the topographical features being stored. In the first pass, the vibrating probe tip is held in engagement with the sample surface. This type of engagement means that the device operates in the manner of an atomic force microscope, with the short range repulsive forces acting between the probe tip and the sample surface determining the amplitude of probe tip vibration, and with the position about which such vibrations are centered being controlled through a servo system so that a constant amplitude of vibration, and hence a constant level of engagement, is maintained.

In the second pass, the end of a cantilever extending from the probe tip is vibrated as a second frequency (which may be the same as the first frequency) and at a predetermined vibration amplitude to producer vibration of the probe tip at a second amplitude. The end of the cantilever being vibrated in this way is the end opposite the place where the probe tip is attached to the cantilever. The second vibration amplitude is variable within the force field as force gradients within the field act on the probe tip. The second vibration amplitude is substantially less than the first vibration amplitude. The probe tip is additionally moved in accordance to the data representing topographical features, which has been stored in the first pass, so that a center of the vibration of the probe tip is held at a second-pass predetermined spacing away from the sample surface. The second vibration amplitude is measured to determine levels of the force field. In the second pass the probe tip is vibrated out of engagement with the sample surface.

A force field extending outward from the sample surface is established when the probe tip is attracted toward, or repelled from, the surface of the sample as a result of conditions at or near this surface. For example, a magnetized probe tip encounters a force field as it is moved adjacent the surface of a sample having magnetized regions. Such regions may form a pattern of magnetically recorded data. If an electrical potential is applied to a probe tip, it encounters a force field as it is moved adjacent the surface of a sample having electrically charged areas. Such a force field typically has an associated gradient in the Z-direction, extending outward from the sample surface, with the force between the sample and the probe becoming stronger as the surface is approached.

DESCRIPTION OF THE INVENTION

Figure 1:
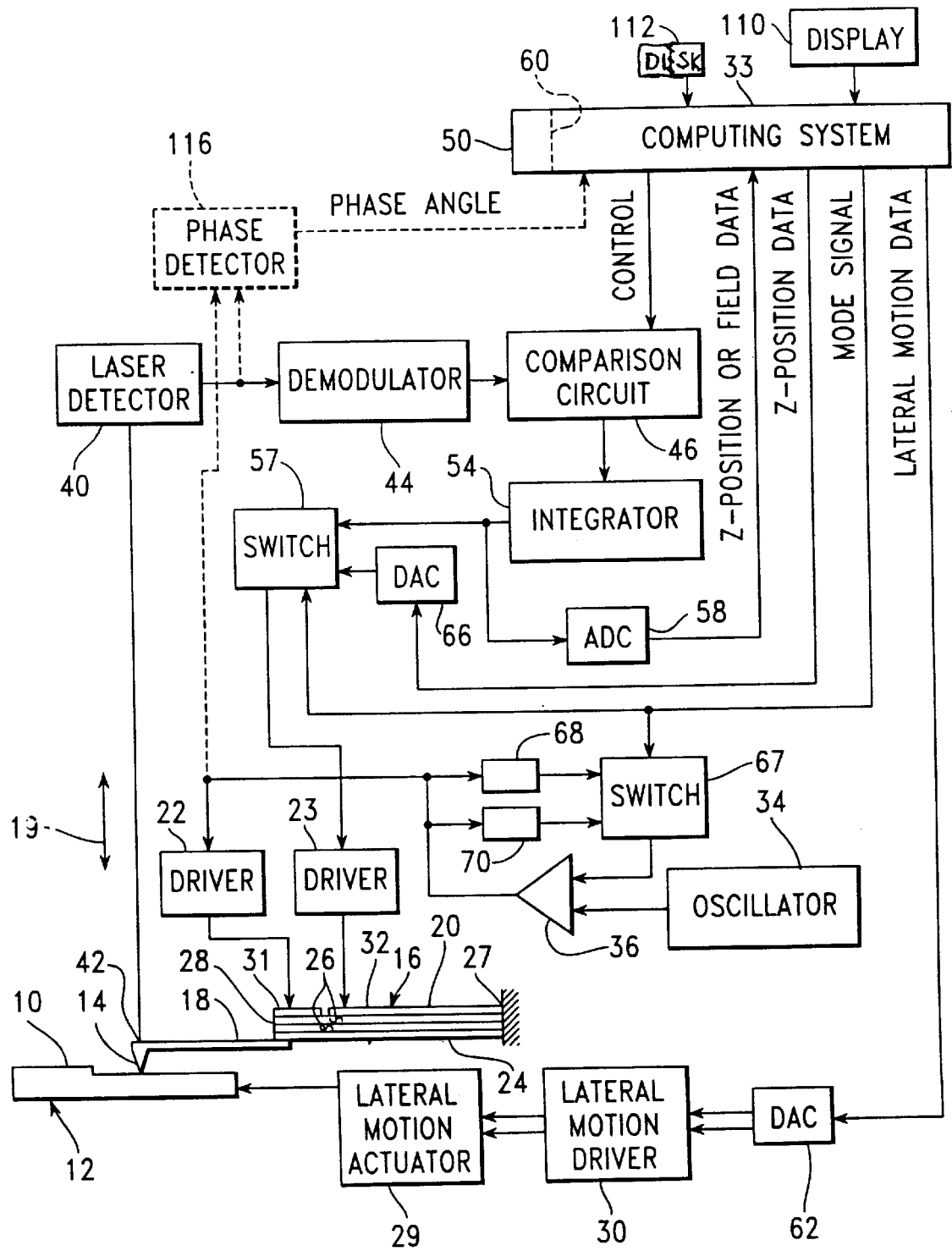
FIG. 1 is schematic view of apparatus built in accordance with the present invention.

FIG. 1 is a schematic view of apparatus built in accordance with the present invention. In this apparatus, both the topographical characteristics of a surface 10 of a sample 12 and the magnetic field extending outward from the surface 10 are measured by means of a probe tip 14, which is attached to a bimorph piezoelectric actuator 16 through a cantilever 18. The probe tip 14 is moved into and out of engagement with the sample surface 10, in the directions of arrow 19, as voltage signals are applied to upper electrode 20 of the bimorph piezoelectric actuator by means of driver circuits 22, 23, with the lower electrode 24 thereof being maintained at electrical ground. The actuator 16 includes a pair of strips 26 of piezoelectric material extending between the electrodes 20, 24. The proximal end 27 of the actuator 16 is clamped, while the distal end 28 thereof is fastened to the cantilever 18. The sample 12 is moved in a pattern of lateral scanning motion parallel to the surface 10 by means of a lateral motion actuator 29, operating in response to voltages applied by a lateral motion driver 30.

In the example of FIG. 1, the upper electrode 20 is segmented, being divided along a transverse line into a vibration excitation segment 31, to which a vibration excitation signal is applied by driver circuit 22, causing the probe tip 14 to vibrate, and a position control electrode segment 32, to which a position control signal is applied by driver circuit 23, causing the probe tip 14 to follow topographical features of the sample surface.

While the method shown and discussed herein provides for vertical motion of the probe tip 14 and lateral motion of the sample 12, it is understood that it is the relative motion between the tip and sample which must be controlled. For example, both the vertical and lateral motion may be applied to the tip 14 as it is moved relative to a stationary sample.

In operation according to the present invention, the sample 12 is moved along a scan line in a first pass, with the apparatus functioning as an atomic force microscope, to determine the topography of sample surface 10 along the scan line. The topographical data developed during this first pass is stored for use in a second pass along the same scan line, so that the probe can be held at a pre-determined distance from the sample surface 10 as magnetic field measurements are made.

A computing system 33 controls operation of this apparatus during both of these passes, generating a MODE SIGNAL to indicate which pass (first or second) is currently being performed. During each pass, the probe tip 14 is caused to vibrate in the vertical directions of arrow 19 by the application of a vibrational excitation signal from an oscillator 34 to the excitation driver circuit 22. This signal is applied through a variable-gain amplifier 36. In both first and second passes, the oscillator 34 preferably causes vibration of the actuator 20 at a frequency near the resonant frequency of the cantilever 18, which is typically between 100 KHz and 1 MHz. Alternately, the excitation frequency applied in the second pass may be differ from the frequency of the first pass, for example, through the use of an additional oscillator, to optimize the detection process.

In the first pass, the motion of probe tip 14 is measured by a laser detector 40, which uses interferometry to develop a motion signal indicating the movement of the probe tip 14. This output is based on the movement of a reflective surface 42 moving with the probe tip 14. This output signal is provided as an input to a demodulator 44, which in turn provides an output describing the amplitude of probe tip vibration at the frequency of oscillator 34, as measured by the laser detector 40. The output of demodulator 44 is in turn used as an input to a comparison circuit 46. The other input to comparison circuit 46 is a control signal voltage provided from the computing system 33.

As the distance between the probe tip 14 and sample surface 10 is decreased, the amplitude of vibrations at the tip 14 decreases. As this distance is increased, this amplitude increases, up to an amplitude occurring with free vibration of the probe tip 14 in an absence of contact with the sample surface 10. In a useful range of engagement between the tip 14 and the surface 10, this effect is controlled by short range repulsive forces acting between the tip 14 and the surface 10.

During this first pass, the vertical piezoelectric actuator 16 is preferably used to maintain a vibration of the probe tip 14 at a constant amplitude while it is in contact with the sample surface 20. To move the probe tip 14 in the vertical directions of arrow 19 in order to compensate for such changes in the topography of sample surface 10, the comparison circuit 46 generates a correction signal which is a difference between a CONTROL signal from the computing system 33 and the output signal from demodulator 44. This CONTROL signal provides a setpoint level determining the vibration amplitude at which the probe tip 14 is operated. The correction signal from comparison circuit 46 is applied as an input to an integrator 54, which is used to cause the cancellation of small errors occurring rapidly in opposite directions in the correction signal. The output of integrator 54 is provided as an input to a switching circuit 57.

During the first pass, switching circuit 57 applies this input from integrator 54 to the position control driver circuit 32, causing the position control driver electrode segment to move the probe tip 14 as required to maintain the output at a level corresponding to the CONTROL signal provided as an input to the comparison circuit 46 from the computing system 33. That is, if the amplitude signal from demodulator 44 is too high, the probe tip 14 is lowered; if the amplitude signal is too low, the probe tip is raised. The other signal applied to the segmented piezoelectric actuator 16 is derived from the output of oscillator 34, which is passed through a variable-gain amplifier 36, which transmits the vibration signal from oscillator 34.

Also during the first pass, the output of integrator 54 is applied through an analog-to-digital convertor 58 as an input to the computing system 33. This signal carries information describing the voltage being applied to vertical driver 22. Since this voltage determines the deflection achieved within the piezoelectric actuator 16, and since this actuator 16 is being driven in the first pass through a servo loop to maintain a pre-determined level of engagement with the sample surface 10, the Z-position data from analog-to-digital convertor 58 provides an accurate description of the topography of sample surface 10. Since the vibration excitation of oscillator 34 is added to the output of integrator 54 in first pass amplifier 56, the output of analog-to-digital convertor 58 describes a center line of vertical motion, to which vibratory motion is added.

Computing system 33 includes an internal random access memory 60 in which the Z-position data from analog-to-digital convertor 58 is stored during the first pass. The computing system 33 also controls the lateral scanning movement of the sample 12 along a plane perpendicular to the vertical directions of arrow 19, by providing input signals to lateral motion driver 30 through a digital to analog convertor 62. In general, this lateral movement occurs in two directions which are perpendicular to one another, so the lateral motion actuator 29 provides movement in these two directions. During a single scan, the sample may be moved along a line in only one of these two directions, with movement in the other direction being used to step between scan lines.

During the process of examining the sample surface 10, each first pass, performed as described above, is followed by a second pass along the same line as the first pass. In the second pass, topographical data stored in the first pass is used to move the probe tip 14 in the vertical direction of arrow 18, as a vibration is applied to the probe tip 14, which then vibrates about a pre-determined center line of motion above the sample surface 10. In accordance with the present invention, during the second pass, the probe tip 14 is held out of contact with the sample surface 10, the probe tip 14 is vibrated at a substantially lower amplitude than in the first pass, so that the probe tip 14 does not contact the sample surface 10 at the bottom of its excursion due to vibration, and the center of the peak-to-peak pattern of vibration is at the same level as during the first pass, or it is closer to the sample surface 10 than this first pass level through a constant offset distance. To provide the desired reaction to the magnetic field being investigated, the probe tip 14 is composed of, or coated with, a ferromagnetic material which is magnetized to provide a pole of either north or south polarity at the apex of the tip. As described above in the Prior Art section, Roland Wiesendanger, in *Scanning Probe Microscopy and Spectroscopy—Methods and Applications,* Cambridge University Press, 1994, on pages 253–256, describes a processes which may be used to produce a tip of this kind.

Thus, during the second pass, switching circuit 57 is operated in response to the MODE SIGNAL, so that the vertical actuator driver 23 is driven by the output of a digital-to-analog convertor 66. The computing system 33 drives the topographical data stored during the first pass into this convertor 66 during the second pass. The second pass can occur in a reverse, or retrace, direction, opposite the direction of the first pass, with the data in memory 60 being read out in a reverse order from that in which it has been recorded. This type of operation has advantages of increased process speed and of facilitating the correction of slow drifting conditions affecting lateral movement of the sample 12.

In a first alternative version of this motion, at the end of the first pass, the sample 12 is returned by lateral motion actuator 29 to its position at the beginning of the first pass, and the data in memory 60 is read out in the order in which it has been recorded. In either case, if it has been determined that the center line of probe tip motion is to be moved closer to the sample surface 10 than the center line of such motion during the first pass, a suitable constant value is subtracted, within the computing system 33, from each of the vertical positions in the data being read from memory 60.

In a second alternative version of this motion, during the first pass, the sample 12 is moved in a "V"-shaped, or sawtooth pattern, with motion along both of the equal-length but angularly displaced legs of the "V" being completed. Then, after the sample is returned to the starting position of the "V"-shaped pattern, the second pass motion occurs along this same pattern.

The gain of amplifier 36 is varied between the first and second passes through the operation of a switching circuit 67 in response to the MODE SIGNAL from computing system 33. When the apparatus is performing a first pass, the switching circuit 67 directs the feedback loop of amplifier 36 through a first feedback circuit 68. When the apparatus is performing a second pass, the switching circuit 67 directs the feedback loop of amplifier 36 through a second feedback circuit 70. The difference in reactance, i.e. resistance and capacitance, between the feedback circuits 68, 70, is sufficient to cause a variation in the gain of the amplifier 36, so that the amplitude of the vibration signal driving the vertical driver circuit 22 is substantially greater during the first pass than during the second pass.

During the second pass, the levels of probe tip vibrations measured within demodulator 44 and provided as an input to the computing system 33 through analog-to-digital convertor 58 is used, in a manner discussed below in reference to FIGS. 2 and 3, to determine the direction and strength of magnetic fields extending outward from the sample surface 10. While the interaction between the probe tip 14 and the sample surface 10 in the first pass is mainly in the form of a short range repulsive force, in the second pass, this interaction is a long range magnetic interaction.

Figure 2:
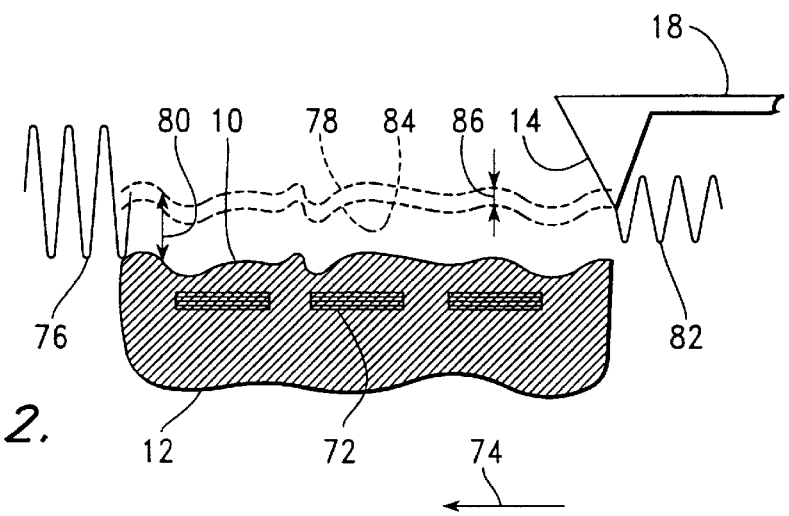
FIG. 2 is a vertical cross-sectional view of a sample being examined within the apparatus of FIG. 1, together with a graphical view of movement of a probe tip within the apparatus of FIG. 1.

FIG. 2 is a vertical cross-sectional view of the sample 12, schematically showing the relative vertical movement of probe tip 14 associated with the first and second lateral positioning passes of the sample 12. The sample 12 includes a surface 10 being examined and a number of magnetized ranges 72 lying under the surface 10. During the first pass, sample 12 is moved in the direction of arrow 74, while a vibration pattern 76 is applied to the probe tip 14. As described in reference to FIG. 1, the center of the vibration of the probe tip follows the topography of the surface 10 along a line 78, being displaced above the surface 10 by a pre-determined level 80. During the second pass, sample 12 is moved opposite the direction of arrow 74 while a vibration pattern 82 is applied to the probe tip 14. The line 84 representing the center of vibration of the probe tip 14 during the second pass is displaced downward from the former center line 78 through a differential displacement distance 86.

The accurate measurement of the magnetic field associated with subsurface magnetic regions, such as regions 72, requires the second pass measurement to be made with the probe tip 74 being moved out of contact with the sample surface 10, but with the center line of vibration being moved at a fixed distance from the sample surface 10. In particular, contact between the probe tip 14 and the sample surface 10 causes signals from topographical features of the surface to become confused with signals due to magnetic fields. Also, moving the center of vibration away from the surface 10 results in a loss of spatial resolution. In accordance with the present invention, these conditions are met by significantly reducing the amplitude of vibrations with which the probe tip 14 is driven during the second pass. Using the present invention accomplishes both of these objectives through a reduction in the amplitude of the excitation vibration during the second pass, as indicated by a comparison of the patterns 82 and 76. With this reduction in vibration amplitude, the center 84 about which vibration occurs is moved toward the sample surface 10 without causing contact between the probe tip 14 and this surface.

In this way, a significant advantage, in terms of spatial resolution, is gained over prior art methods, in which the centerline of probe vibration is actually moved away from the sample surface. This advantage is particularly important in a number of commercially important applications having particularly small magnetized regions, producing outwardly extending fields which quickly fade with distance from the sample surface. While the above discussion has described the second-pass vibration center, indicated by line 84, as being moved downward relative to the first-pass vibration center, indicated by line 78, it is understood that these lines 78, 84 can be coincident while a significant advantage relative to the prior art is maintained, since clearance is established between the vibrating probe tip 14 and the sample surface 10 without a need to move the center of vibration upward for the second pass.

Magnetized regions within the sample 12, such as the regions 72, produce a magnetic field extending beyond the sample surface 10, with a relatively sharp gradient reducing the strength of the field with increasing outward distance from the surface 10. When a suitably small magnetized probe, such as probe tip 14, is placed in such a field, a force acts upon it, which is either attractive, pulling the probe in the direction of increasing field strength toward the sample surface 10, or repulsive, pushing the probe in the direction of decreasing field strength away from the sample surface. In this way a force field is created, with attractive or repulsive forces acting on the probe tip 14, and with these forces varying with the gradients established by the magnetic fields.

Figure 3:
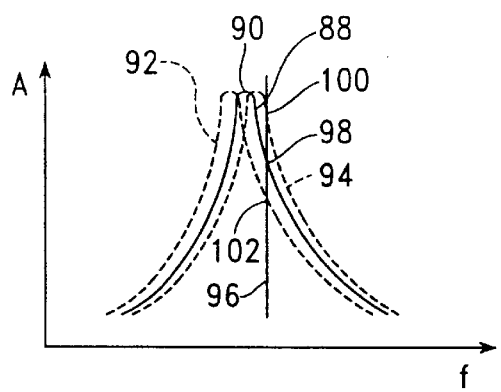
FIG. 3 is a graphical view of the amplitude of vibrations of the probe tip within the apparatus of FIG. 1 under conditions of a varying force field.

FIG. 3 is a graphical view of the effect of a force field of this kind on the vibration response of a vibrating system including the cantilever 18 and probe tip 14 to a constant-amplitude vibration input from the vertical actuator 16 (all shown in FIG. 1). In FIG. 3, the resulting amplitude of tip vibration (A) is shown as a function of the excitation frequency (f). The central curve 88 shows the frequency response of this system in the absence of a force field, with a maximum amplitude of vibrations occurring at a resonant frequency 90. In an attractive force field, with the probe tip being pulled toward the direction of increasing force, the resonant frequency of the system is lowered, as indicated by curve 92. In a repulsive force field, with the probe tip being pushed in the direction of decreasing force, the natural frequency of the system is raised, as indicated by curve 94.

Figure 4:
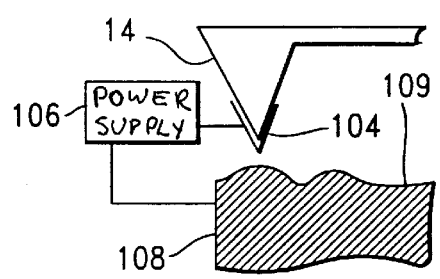
FIG. 4 is a schematic view of modifications to the probe tip of FIG. 1 to facilitate measurements of an electric field.

The excitation frequency from oscillator 34 preferably occurs at an excitation frequency 116 outside the range of resonant frequencies of the vibrating system caused by the force field gradients to be encountered during the testing process. Otherwise, it is possible to have a probe tip amplitude of vibration caused by either an attractive force field or by a repulsive force field. In the example of FIG. 4, the excitation frequency is somewhat above the resonant frequency. Under these conditions, a frequency response having a median amplitude 98 is understood to be a result of vibration of the probe tip 14 in the absence of a force field, a frequency response having an amplitude 100 greater than the median amplitude 98 is understood to be a result of vibration of the probe tip 14 in a repulsive force field, and a frequency response having an amplitude 102 less than the median amplitude 98 is understood to be a result of vibration of the probe tip 14 in an attractive force field. The level of the vibration amplitude above or below the median amplitude 98 is also a reflection of the level of the force field.

Referring to FIGS. 2 and 3, the relationships between levels of vibration described in reference to FIG. 2 are understood to reflect conditions of actual tip motion, including the effects of resonance described in reference to FIG. 3. While a constant amplitude and frequency of vibration is applied to the actuator 20 during the second pass, the resulting amplitude of vibration of probe tip 14 is expected to vary with changes in the force field through which the probe tip 14 is moved. In accordance with the present invention, despite such variations, the resulting amplitude of tip vibrations during the second pass remains significantly less than the amplitude of tip vibrations occurring during the first pass, so that the probe can be moved through the second pass without the requirement of the prior art to raise the center of tip vibrations above its level in the first pass.

While the above discussion in reference to FIG. 1 has described the use of a single oscillator driving a variable-gain amplifier to provide an oscillating signal at different frequencies during the first and second passes, FIG. 3 indicates that the requirements for a change in amplitude between the first and second passes may be met by changing the frequency of vibration from the resonant frequency of the cantilever, at which the highest level of vibrations occur during the first pass, to a different frequency of vibrations during the second pass.

The preceding discussion has also described the use of the present invention to measure the external fields produced by magnetic regions within the sample 12. The present invention may also be used for other purposes, such as measuring the external fields caused by electrically charged regions in the sample.

FIG. 4 is a schematic view of modifications applied to the probe tip 14 to facilitate the measurement of electric field. A conductive covering 104, placed over the tip 14 is connected to a power supply 106. The other terminal of power supply 106 is electrically connected to the sample 108, so that an electrical potential is applied to the conductive coating 104 relative to the sample 108. Depending on the nature of the sample 108, the power supply 106 may be attached, for example, to a internal or external conductive plane of the sample. Since opposite-signed charges attract, while like-signed charges repel one another, this configuration establishes a force field having gradients diminishing the level of force with movement away from the sample surface 109. Thus, the results described above in reference to FIG. 3 are found, and the directions and levels of the force fields are determined as described above.

Referring again to FIG. 1, the preceding discussion describes the use of variations in the amplitude of probe tip vibration to measure changes in probe engagement in the first pass, and to measure a level of the force field gradient in the second pass. Alternately, the force field gradient may be measured in the second pass by determining the phase angle between the probe tip vibrations and the vibration excitation signal driving the actuator 16. Thus, an alternative version of the apparatus includes additional elements shown in FIG. 1 with dashed lines, adding a phase detector 116, which is provided with input signals composed of the vibration excitation signal used to drive excitation driver 22 and the output signal from laser detector 40. The phase detector 116 produces a signal indicating the phase difference between the excitation signal to driver 22 and the probe tip vibration measured by laser detector 40. During the second pass, the computing system 33 accepts this phase angle data from the phase detector 116 for computation, transmission, and/or storage within the data memory 60.

Figure 5:
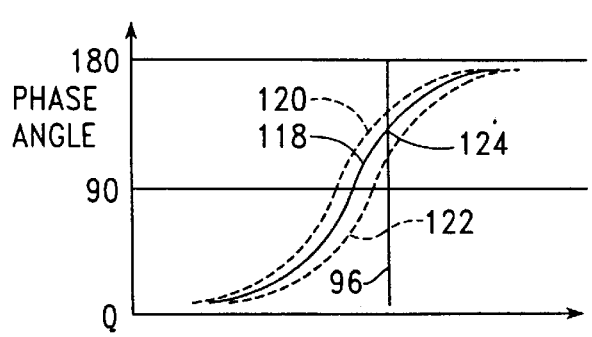
FIG. 5 is a graphical view of the phase angle between a signal exciting vibration of the probe tip and the vibration of the probe tip itself, in the apparatus of FIG. 1, under conditions of a varying force field.

FIG. 5 is a graphical view of the effect of force field gradients on the phase angle relationship between the excitation signal driving excitation driver 22 and the vibration of probe tip 14. The displacement of the three curves in FIG. 5 reflects the displacement of the natural frequency due to a force field gradient, as discussed above in reference to FIG. 3. Each of the phase angle curves in FIG. 5 asymptotically approaches an angle of zero degrees as the frequency approaches zero and an angle of 180 degrees as the frequency becomes very high, with the probe tip 14 vibration in all cases lagging the excitation signal. When the excitation signal is at the natural frequency of the vibrating system, including the probe tip 14 and cantilever 18, the phase angle is at 90 degrees. Thus, the central phase angle curve 118 represents the response of this vibrating system in the absence of a force field. In an attractive force field, the natural frequency is reduced, causing the phase angle to vary as shown by curve 120. In a repulsive force field, the natural frequency is increased, causing the phase angle to vary as shown in curve 122.

Phase angle measurements are made with excitation at a constant frequency represented by line 124 being applied through excitation driver 22. This constant frequency may be at or near the resonant frequency of the vibrating system in the absence of a force field. An increase in the measured phase angle above the phase angle 124 measured in the absence of such a field indicates an attractive force, while a decrease in the this measured phase angle below the phase angle 124 indicates a repulsive force. The distance between the measured phase angle and the phase angle 124 also indicates the magnitude of the force field gradient.

Figure 6:
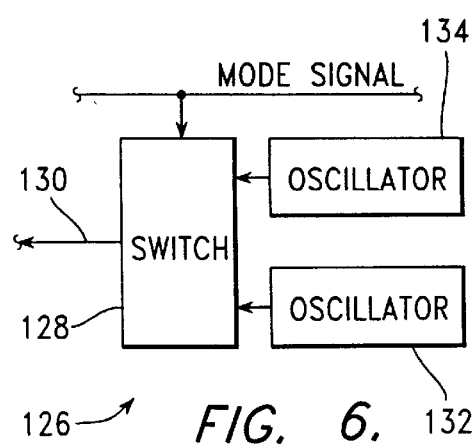
FIG. 6 is a schematic view of an alternate excitation circuit used to provide different excitation frequencies vibrating the probe tip in the apparatus of FIG. 1 during measurement of topographical features and a varying force field.

FIG. 6 is a fragmentary schematic diagram showing an alternative excitation signal circuit 126, which is used with other components described above, in reference to FIG. 1, to provide for separate excitation frequencies between the first and second passes. In this alternative excitation signal circuit 126, a switch 128 connects an output line 130 to either a first oscillator 132 or a second oscillator 134 in accordance with the condition of the MODE SIGNAL. The output line 130 provides inputs to the excitation driver 22. In this configuration, the use of a variable gain amplifier 36, as described above in reference to FIG. 1, is not required, since the previously-described relationships between vibration amplitudes within the first and second passes can readily be obtained by adjusting the circuits of the oscillators 132, 134.

Referring to FIGS. 1 and 6, during the first pass, with the device operating as an atomic force microscope, maximum sensitivity to changes in topography is achieved when the excitation frequency is equal to the resonant frequency of the cantilever 18 with the probe 14 attached thereto. However, as described above in reference to FIG. 3, when the device is used to measure a force field gradient by means of measuring variations in the amplitude of probe vibration, the excitation signal to driver 22 should be at a frequency somewhat above or somewhat below the resonant frequency, in order to make it possible to determine the direction of the force field gradient causing a change in tip vibration amplitude, and in order to maximize the level of amplitude change caused by a change in the force field gradient. The excitation frequency during force field measurements is preferably outside a range of resonant frequencies which may be encountered during such measurements. Thus, with measurements during both first and second passes being made using variations in the probe amplitude, maximum levels of sensitivity are obtained with the alternative signal excitation circuit 126 being used provide an input signal to the driver 22 at the resonant frequency during the first pass and at a level somewhat above or below the resonant frequency during the second pass.

Continuing to refer to FIG. 1, the methods described above are used to develop both topographical data and data describing a force field resulting from a magnetic or electric field on the sample surface 10, with both types of data relating to a portion of the surface 10 extending along a single line which is scanned twice. This process is then repeated, as the sample is stepped to other lines which are similarly scanned twice, until an entire surface area of interest has been scanned. The topographical and force field data is typically stored and displayed on a display unit 110, using one of a number of well known techniques for rendering such data visible and recognizable, through the use of topographical lines, colors, shading, etc. This data may also be transmitted to one or more remote locations.

The computing system 33 executes one or more subroutines, stored therein after being supplied in the form of a number of magnetically recorded disks 112. These subroutines control the operation of the apparatus of FIG. 1, during both first and second passes as described above, and control the storage and conversion of data concerning sample topography and field strength.

While the present invention has been described in its preferred forms or embodiments with some degree of particularity, it is understood that this description has been given only by way of example and that numerous changes in the details of construction, fabrication and use, including the combination and arrangement of parts may be made without departing from the spirit and scope of the invention. For example, while the vertical actuator moving the probe has been shown to be a segmented bimorph piezoelectric actuator having the vibration excitation signal applied to a one segment of a segmented electrode, while the positioning signal is applied to the other segment thereof, the invention may alternately applied through the use of another type of actuator, which is driven by a signal comprised of a sum of a position signal and a vibration signal.

What is claimed is:

1. A method for measuring a force field extending outward from a sample surface along a line, wherein said method comprises steps of:

moving said sample surface and a probe tip relative to one another so that said probe tip traverses said line in a first pass, with said probe tip being attached through a flexible coupling to an actuator moving said probe tip in a direction perpendicular to said sample surface and vibrating at a first frequency, with an amplitude of tip vibration at said probe tip being measured to develop a vibration level signal, and with a comparison of said vibration level signal with a setpoint signal determining a drive signal applied to said actuator to hold said amplitude of tip vibration at a first amplitude level, whereby a center of tip vibration motion is held at a first predetermined spacing away from said sample surface, and with data representing positions of a center of vibration of said actuator being stored in a data memory as indications of topographical features of said sample surface along said; and moving said sample surface and said probe tip relative to one another so that said probe tip traverses said line in a second pass, with said actuator vibrating at a predetermined amplitude and at a second frequency, so that said probe tip is vibrated in said direction perpendicular to said sample surface at a level of vibration having an amplitude of vibration substantially less than said first amplitude level, with a drive signal being applied to said actuator being generated in accordance with said data representing levels of said center of tip vibration stored in said data memory during said first pass, so that said center of tip vibration motion is held at a second predetermined spacing away from said sample surface, and with data representing a characteristic of vibrating movement of said probe tip being stored in said data memory as indications of gradient levels of said force field.

2. The method of claim 1, wherein said first and second predetermined spacings are equal.

3. The method of claim 1 wherein said first predetermined spacing is substantially larger than said second predetermined spacing.

4. The method of claim 1, wherein said first and second frequencies are equal.

5. The method of claim 1, wherein said characteristic of vibrating movement of said probe tip is an amplitude of vibration thereof.

6. The method of claim 5, a resonant frequency of said flexible coupling with said probe tip attached thereto varies within a frequency range as force field gradients are measured in said step (c);

said probe tip is vibrated at a first frequency equal to a resonant frequency of said flexible coupling with said probe tip attached thereto in an absence of a force field gradient during said first pass, and said probe tip is vibrated at a second frequency outside said frequency range during said second pass.

7. The method of claim 1, wherein said characteristic of vibrating movement of said probe tip is a phase angle between vibration thereof and said drive signal being applied to said actuator.

* * * * *